(12) United States Patent
Mestdagh

(10) Patent No.: US 7,257,128 B2
(45) Date of Patent: Aug. 14, 2007

(54) MASTER-SLAVE DATA TRANSMISSION IN ORTHOGONAL FREQUENCY-DIVISION MULTIPLEXING

(75) Inventor: Denis J. Mestdagh, Saint Martin d'Uriage (FR)

(73) Assignee: STMicroelectronics S.A., Montrouge (FR)

( * ) Notice: Subject to any disclaimer, the term of this patent is extended or adjusted under 35 U.S.C. 154(b) by 1093 days.

(21) Appl. No.: 10/163,176

(22) Filed: Jun. 5, 2002

(65) Prior Publication Data

US 2002/0186715 A1 Dec. 12, 2002

(30) Foreign Application Priority Data

Jun. 6, 2001 (FR) .................................. 01 07393

(51) Int. Cl.
*H04L 12/66* (2006.01)
(52) U.S. Cl. ...................................... 370/463; 370/419
(58) Field of Classification Search ........ 370/203–210, 370/419–421; 709/208–211; 375/260, 220, 375/222
See application file for complete search history.

(56) References Cited

U.S. PATENT DOCUMENTS

| | | | |
|---|---|---|---|
| 5,185,591 A | 2/1993 | Shuey | |
| 5,557,612 A | 9/1996 | Bingham | |
| 5,625,651 A | 4/1997 | Cioffi | |
| 5,644,573 A | 7/1997 | Bingham et al. | |
| 5,933,454 A | 8/1999 | Cioffi | |
| 6,108,349 A * | 8/2000 | Melsa et al. .................. | 370/465 |
| 6,148,024 A * | 11/2000 | Ho et al. ...................... | 375/222 |
| 6,240,129 B1 * | 5/2001 | Reusens et al. .............. | 375/222 |
| 6,282,167 B1 | 8/2001 | Michon et al. | |
| 6,404,293 B1 * | 6/2002 | Darabi et al. ................. | 331/37 |
| 6,415,133 B1 * | 7/2002 | Brede et al. ................ | 455/3.05 |
| 7,002,945 B2 * | 2/2006 | Ichiyoshi ..................... | 370/342 |
| 2002/0055356 A1 * | 5/2002 | Dulin et al. ................. | 455/422 |

FOREIGN PATENT DOCUMENTS

| | | |
|---|---|---|
| EP | 0 933 897 A2 | 8/1999 |
| EP | 1 021 012 A1 | 7/2000 |
| EP | 1 065 818 A1 | 1/2001 |
| FR | 2 797 131 A1 | 2/2001 |
| GB | 2 332 602 A | 6/1999 |
| WO | WO 99 23764 A1 | 5/1999 |

OTHER PUBLICATIONS

Mestdagh, et al., *Zipper VDSL: A Solution for Robust Duplex Communication over Telephone Lines*, IEEE Communications Magazine, May 2000, pp. 90-96.
Gardner, et al., HomePlug Standard Brings Networking to the Home; Jan. 3, 2001, pp. 1-6.

* cited by examiner

*Primary Examiner*—Chi Pham
*Assistant Examiner*—Thai Hoang
(74) *Attorney, Agent, or Firm*—Lisa K. Jorgenson; William R. McClellan; Wolf, Greenfield & Sacks, P.C.

(57) ABSTRACT

A method for transmitting data between a master modem and at least one slave modem of a master-slave network in orthogonal frequency-division multiplexing, including assigning to each slave modem at least one transmit frequency band and at least one receive frequency band chosen in a range of frequencies likely to be processed by the master modem; and in each slave modem: oversampling, respectively undersampling, each transmitted or received symbol; and filtering upstream of the oversampling, respectively of the undersampling, by a band-pass filter of the corresponding assigned frequency band.

17 Claims, 3 Drawing Sheets

MASTER-SLAVE DATA TRANSMISSION IN ORTHOGONAL FREQUENCY-DIVISION MULTIPLEXING

BACKGROUND OF THE INVENTION

1. Field of the Invention

The present invention relates to the field of shared multipoint-to-multipoint communication networks.

The present invention will be described hereafter in relation with an example of application to networks using the electric supply conductors (for example, the mains) as a transmission medium. High-frequency sub-carriers which are modulated to transmit data between one or several devices equipped with modems (modulator-demodulator) and connected to the mains are generally used. Such networks may be used, for example, to connect a microcomputer to its peripherals (printer, scanner, etc.). They may also distribute, within a home, an office or the like, multimedia data coming from a connection to an external access, for example, a satellite antenna, an optical fiber cable, a modem cable, an XDSL modem, etc.

2. Discussion of the Related Art

Since various devices may simultaneously need to transmit information over the shared network, an access control mechanism of the transmission means (MAC) is necessary to avoid collisions which would result in information losses. Further, since different multimedia services or transmission types are likely to use the same electric supply conductors and since these different transmissions most often have distinct constraints in terms of delay, bit error rate, etc., an access priority management mechanism more generally designated as a quality-of-service control (QOS) is generally used.

FIG. 1 very schematically shows an exemplary architecture of a transmission network using electric supply conductors L as a transmission medium. The electric supply network connects different taps P together, possibly via an electric board provided with circuit breakers or the like (not shown). Taps P have been symbolized in FIG. 1 as being taps with three conductors (phase, neutral and ground). However, these also may be taps only having two conductors (phase and neutral). From the point of view of the transmission network, each tap is considered as a node Nl, . . . , Ni, . . . , Nj, . . . , Nn.

Among the various electric devices connected to the network, devices 1 are equipped with a modem Mi, Mj respectively connected to nodes Ni, Nj to communicate over the network. In the example of FIG. 1, a device 2 connected on one of the taps is a so-called "master" device, the modem Mm of which is connected to a node Nm of the network. It is thus a network of master-slave type where all devices 1 are slaves of device 2 which manages the transmissions and through which they all pass.

Most often, each device 1 of the first type connected to any tap from the point of view of the electric supply (node from the point of view of the network) should be able to send and receive data. Master device 2 receives all the transmissions and may undertake their redistribution. All transmissions from the slave stations are thus intended for the master node. The network is a so-called point-to-multipoint network.

Data transmission protocols over shared networks can be grouped in three large categories. A first category concerns time-division multiple accesses (TDMA or TDD), which assign different time slots to each transmission. A second category groups code-division multiple accesses (CDMA) which assign different codes for each transmission. A third category concerns frequency-division multiple accesses (FDMA or FDD), which assign one or several frequencies to each transmission.

The present invention more specifically relates to a frequency-division transmission. Each device is assigned a predefined frequency set to transmit data. On the receive side, there exist two solutions. Either a communication control channel is used to indicate which frequencies must be received and demodulated by each device connected to the multipoint-to-multipoint network. Or all receive frequencies are demodulated by all devices and each receive device selects the information intended for it.

A disadvantage of the conventional frequency-division multiple access is that it requires analog filters to separate the frequencies or frequency groups used for the transmit and receive sections of the modems. This is a major disadvantage in terms of flexibility and frequency adaptation capacity since the analog filters which are formed cannot be modified according to the dynamic capacity needs or any other reason requiring modification of the assigned frequencies. On this regard, a specificity of networks using the supply conductors as transmission supports is that the transfer function of the network is likely to strongly vary, for example, upon plugging of an electric device (be it or not equipped with a modem) on the mains.

Conventionally, standards relative to networks using the supply network as a transmission support provide the combined use of a frequency-division multiple access and of a time-division multiple access. This actually is a carrier detection and collision or anticollision detection multiple access (CSMA/CA). According to these transmission standards, the frequency-division multiple access is implemented by using an orthogonal frequency-division multiplexing (OFDM).

This is a well known technique which will be briefly described hereafter. Reference can also be made to literature. For example, article "HomePlug Standard Brings Networking to the Home" by Steve Gardner, Brian Markwalter, and Larry Yonge, published in December 2000 in Communication Systems Design, which is incorporated herein by reference, discusses the application of such a multiplexing to networks using electric power cables as a transmission medium.

The OFDM waveforms are generated by using inverse Fourier transforms (IFFT) in which the points of the frequency field are formed by complex sets of symbols which modulate each carrier. The result of the inverse Fourier transform is called an OFDM symbol. On the receive side, the data are reconstituted from a direct Fourier transform which converts the OFDM symbol in the frequency field.

In an architecture where all devices are identical, each device must be able, in its modem, to isolate all assigned frequencies or frequency bands. To use a simplified modem, a master-slave architecture where the sole master modem is able to receive all frequencies is generally used.

The present invention aims at providing a novel transmission method in a master-slave network.

The present invention also aims at providing a novel orthogonal frequency-division multiplexing data transmission method which avoids use of analog filters to separate the frequency bands used by modems.

The present invention draws its inspiration from a transmission technique known in telephony which is known for being more flexible in terms of frequency assignment. This technique, known as the Zipper-DMT technique, is only conventionally used for point-to-point transmissions and is described, for example, in European patent application N°0, 883,944 which is incorporated herein by reference and in article "Zipper VDSL: A Solution for Robust Duplex Communication over Telephone Lines" by Denis J. G. Mestdagh, Michael R. Isaksson, and Per Ödling, published in May 2000 in IEEE Communication Magazine, pages 90 to 96 which is incorporated herein by reference.

In the application to point-to-point communication systems, different frequency bands are assigned for the transmission and reception (rising direction, falling direction). In this known application to telephony, the assigned frequency bands are the same for all the wires of a same cable and, to avoid a crosstalk phenomenon, the frequencies are not assigned to the different modems but to different cables.

This promising technique is however not directly transposable to networks using the electric supply network as a transmission support.

Among the additional problems encountered in this type of network, which make the application of the conventional Zipper-DMT technique poorly adapted, the fact that the transfer function of the transmission support considerably varies along time (for example, under the effect of the plugging of an electric device), that the transfer function varies from one node to the other, and the fact that it is a multiple-path and multiple-reflection network, should be noted.

SUMMARY OF THE INVENTION

The present invention more specifically aims at enabling application, to point-to-multipoint or multipoint-to-multipoint networks of master-slave type with more than two nodes, of the Zipper-DMT technique known in point-to-point networks.

In an application to master-slave architectures, the distribution of a frequency range among the network devices poses specific problems. A first problem is to maintain the orthogonality of the frequencies (carriers). A second problem is the need for use of analog filters, and thus a loss of flexibility. This is in particular why a time distribution according to the different modems is conventionally used.

The present invention also aims at enabling a dynamic frequency assignment both for the transmission and the reception on each network node.

The present invention further aims at eliminating dead times in transmissions.

To achieve these and other objects, the present invention provides a method for transmitting data between a master modem and at least one slave modem of a master-slave network in orthogonal frequency-division multiplexing, including the steps of:

assigning to each slave modem at least one transmit frequency band and at least one receive frequency band chosen in a range of frequencies likely to be processed by the master modem; and in each slave modem:

oversampling, respectively undersampling, each transmitted or received symbol; and filtering downstream of the oversampling, respectively upstream of the undersampling, by means of a band-pass filter of the corresponding assigned frequency band.

According to an embodiment of the present invention, the oversampling and undersampling ratios are different for each slave modem and are chosen according to the assigned frequency bands.

According to an embodiment of the present invention, a cyclic prefix and a cyclic suffix reproducing a predetermined number of samples, respectively of the end and of the beginning of the symbol, are added to each transmitted symbol.

According to an embodiment of the present invention, the transmission support of the network is formed by the electric supply system.

According to an embodiment of the present invention, the times of symbol transmission beginning from all nodes are synchronized.

According to an embodiment of the present invention, a specific communication channel is used to synchronize the transmissions from the different modems.

According to an embodiment of the present invention, the symbols (OFDM) to be transmitted are shaped to avoid intercarrier interference.

The present invention also provides a slave modem of a master-slave network in orthogonal frequency-division multiplexing including, for transmission between a digital circuit providing OFDM symbols to be transmitted and an analog transceiver front end, an oversampler and a programmable band-pass filter.

The present invention also provides a slave modem of a master-slave network in orthogonal frequency-division multiplexing including, for reception between an analog transceiver front end and a digital circuit processing OFDM symbols, a programmable band-pass filter and an undersampler.

According to an embodiment of the present invention, the oversampling or undersampling ratio is chosen according to one or several frequency bands assigned to the modem.

The foregoing objects, features and advantages of the present invention will be discussed in detail in the following non-limiting description of specific embodiments in connection with the accompanying drawings.

DETAILED DESCRIPTION

Figure 1:
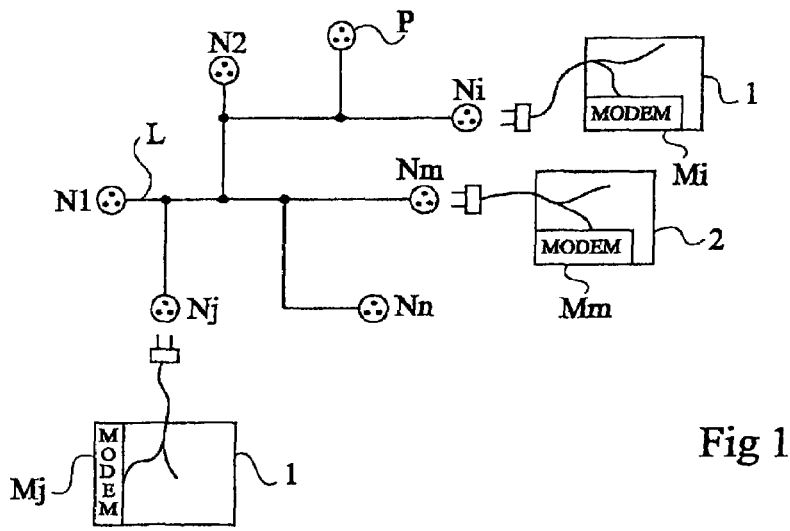
FIG. 1, previously described, very schematically shows a network using the electric supply lines as a transmission medium.

The same elements have been designated with the same references in the different drawings. For clarity, only those elements and those steps of the method which are useful to the understanding of the present invention have been shown in the drawings and will be described hereafter. In particular, the data to be transmitted and their possible coding have not been detailed and are no object of the present invention. The data to be transmitted and the possible coding of these data as well as their transmission protocols depend on the applications, and the present invention may be implemented whatever these types of data and transmission protocols. Further, the access control mechanisms and other mechanisms necessary to the network operation (for example, priority management, etc.) have not been detailed. The possible adaptation of these mechanisms to implement the present invention uses well known techniques within the abilities of those skilled in the art.

Further, only the processings applied between the Fourier transform (inverse transform in transmit mode or direct transform in receive mode) and the analog transceiver front end connected to the tap will be described. The other upstream (respectively downstream for the receive mode) processings for the transmit mode of the Fourier transform are conventional.

According to the present invention, each slave node of the network is assigned a frequency set for its transmissions and a receive frequency set. The transmit and receive frequency sets are different for each node and the transmit frequencies are different from the receive frequencies for a same node. These transmit and receive frequency assignments for each node are managed by the access control mechanism of the network. Only the master slave is able to receive and transmit on all frequency sets.

A feature of the present invention is to provide, in the transmission flow, a cyclic prefix and suffix for each transmitted symbol. This amounts, in the time field and upon transmission of each symbol, to reproducing a predetermined number of samples, respectively of the end and of the beginning of the symbol, and to insert these reproductions at the beginning and at the end of the symbol to fill up the inter-symbol intervals. The number of reproduced samples (or the duration of the prefixes and suffixes) is the same for all transmission flows, but the prefixes may have durations different from those of the suffixes.

The cyclic prefix of each symbol amounts, in the time field, to providing a replica of the last few microseconds of the OFDM symbol that are copied before the symbol, in the segment separating two symbols. The function of the cyclic prefix is to absorb the inter-symbol interference which results from the fact that the delay of a channel is not constant with frequency (that is, the pulsed response of the transmission channel). The use of a cyclic prefix for OFDM symbols in a network using the mains as a transmission support is known from above-mentioned article "HomePlug Standard Brings Networking to the Home".

The prefix and the suffix provided by the present invention are used to avoid use of analog filters. Indeed, by repeating part of the data at the beginning and at the end of a symbol, discontinuities upon reception of different symbols simultaneously received by different nodes are avoided. Such discontinuities translate, on the receive side for the direct Fourier transform, by noise extending over the adjacent (carrier) frequencies, which adversely affects a correct reception. Since, according to the present invention, dead times between symbols are filled in the time field by the repeated data and the operation of a direct Fourier transform is cyclic, the starting point for taking a symbol into account may vary within the interval containing the signal, that is, the duration of the symbol plus the prefixes and suffixes, without loss of any information. This amounts to saying that the carriers of the different symbols keep their orthogonality in the frequency range. It is thus possible to no longer use analog filters but to only demodulate the receive frequencies assigned to the receiver. This is made possible since, further, each modem (more generally, each node) is assigned one set of transmit frequencies and one set of receive frequencies.

Further, use of a time-division multiple access is avoided, which results in a greater general capacity, as well as in a more efficient priority and quality-of-service control.

Figure 2:
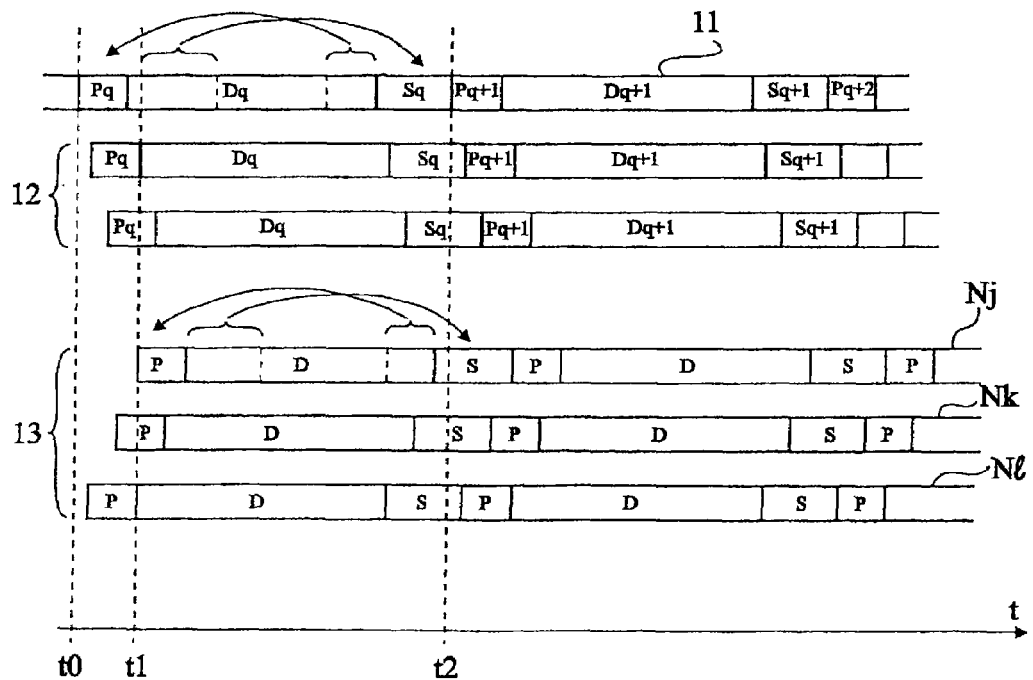
FIG. 2 illustrates, in the form of timing diagrams, an embodiment of the present invention.

FIG. 2 illustrates, by simplified timing diagrams, an embodiment of the present invention.

Assume a data transmission flow 11, transmitted by node Ni at a time t0. This flow successively contains OFDM symbols Dq, Dq+1. Each symbol is preceded by the preceding or following symbol by a segment in which is copied a portion of each of the neighboring symbols. In practice and according to the present invention, each symbol Dq is preceded by a prefix Pq reproducing a time interval corresponding to the end of symbol Dq and is followed by a suffix Sq corresponding to a copy of the beginning of symbol Dq.

In the time field, other data flows at different frequencies overlap on receive node Ni. As illustrated in FIG. 2, these overlappings first result from reflections 12 of transmitted flow 11. These reflections of course are reproductions in time of original flow 11 delayed according to the propagation times. To simplify, only two reflections 12 have been shown. It should however be noted that these reflections are multiple in such a network.

Other interferences are formed by the symbol flows 13 transmitted by other nodes in the network. In the example of FIG. 2, three flows 13 corresponding to transmissions from nodes Nj, Nk, and Nl have been shown. The structure of each data flow is the same as that discussed for flow 11, that is, each time includes a prefix P and a suffix S associated with each symbol. Of course, multiple reflections of flows 13 also reach node Ni.

The frequencies in which flows 13 are transmitted are different for each of these flows and different from the frequencies in which flow 11 is transmitted. Accordingly, on the side of node Ni, the receive frequencies which are assigned thereto can be easily accepted. It is enough for the receive window to be included between times t1 and t2 between which only the symbols of same rank (q) are present. The determination of the receive window within range t1-t2 is performed in a conventional initialization phase (time synchronization) at the beginning of each communication and may be adapted (set back in phase) during communication.

It should be noted that, once back in the frequency field (after the direct Fourier transform), the fact that the recovered modulated data come from body D of the symbol or from suffix S has no more importance.

The length of the cyclic suffix is chosen according to the propagation delays of the network and, more specifically, to the signal reflection or reception delay on a given node.

According to an embodiment corresponding to the illustration of FIG. 2, the transmission of the different modems is synchronized so that all modems connected to the network nodes transmit at the same time. In this case, the duration of the cyclic suffix can be advantageously limited to once the maximum propagation time of the network, taking into account all possible reflections and paths (multiple-paths).

According to another embodiment, use of a synchronization of the transmissions is avoided by shaping the OFDM symbols to be transmitted to avoid, upon reception on a same node, intercarrier interference among several symbols transmitted by different nodes. Such a shaping technique is well known in other fields of application of OFDM symbols such as, for example, the receiving of video signals on reception antennas of terrestrial radio signals (rack antenna) or telephony, and is described, for example, in above-mentioned article "Zipper VDSL: A Solution for Robust Duplex Communication over Telephone Lines". Such a shaping however requires grouping the carriers of each set assigned to each node (FIG. 3B).

It should be noted that all OFDM symbols must imperatively have the same length (duration T). This length is defined by interval Δf between two successive carriers of the amplitude and phase quadrature modulation (T=1/Δf).

Conventionally, to avoid use of complex equalizers in receive mode and avoid intersymbol interference, the duration of the cyclic prefixes is greater than (at least equal to) the pulsed response of the transmission network.

According to the present invention, the master node is able to demodulate all transmission frequencies and is also able to transmit over all frequencies. However, each slave node is assigned one transmit frequency set and one receive frequency set. The frequency sets are grouped by bands for each transceiver.

The actual frequency assignments are performed by conventional means. In particular, these frequency assignments are performed while taking account of the fact that the modulation is an amplitude and phase quadrature modulation. Constellations of more or fewer points may be used (for example, between 4 and 1024 points) according to the signal-to-noise ratio. It will only be ascertained, as is conventional, to avoid overlapping the next constellation point with the noise of the involved point.

Figure 3A:
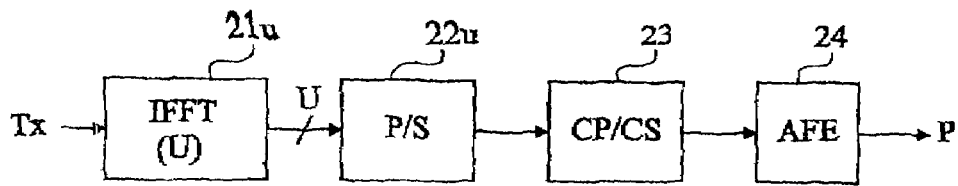
FIGS. 3A and 3B illustrate, in the form of functional block diagrams, an embodiment of the present invention, on the master node side.
Figure 3B:
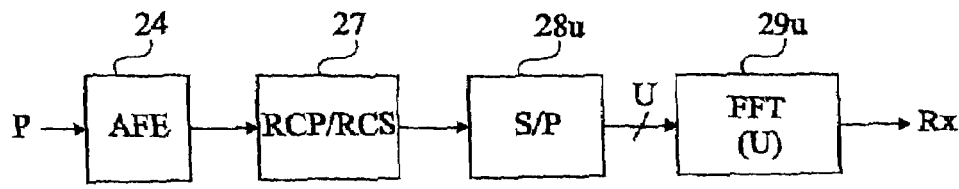

FIGS. 3A and 3B partially show, with functional block diagrams, the involved circuits, respectively in the transmit and in the receive mode, according to an embodiment of a master modem of the present invention.

Figure 4A:
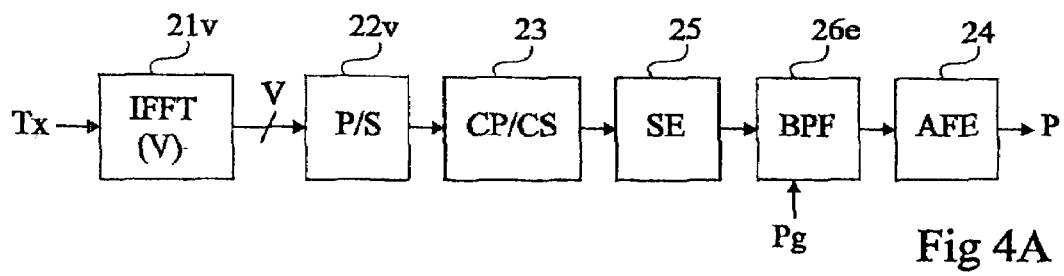
FIGS. 4A and 4B illustrate, in the form of functional block diagrams, an embodiment of the present invention, on the slave node side.
Figure 4B:
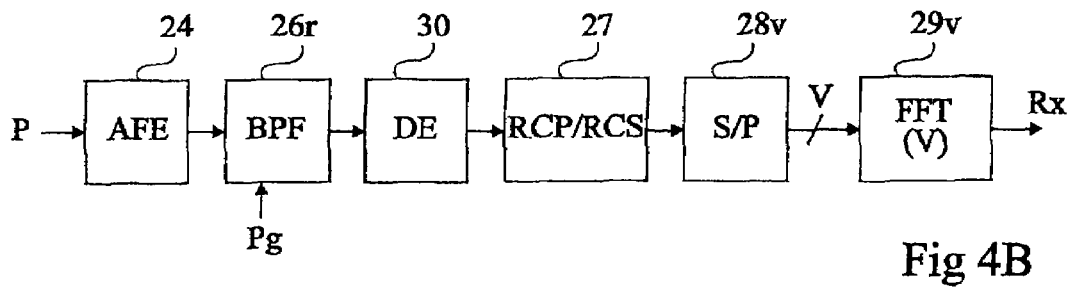

FIGS. 4A and 4B partially show, with functional block diagrams, the involved circuits, respectively, in transmit and in receive mode, according to an embodiment of a slave modem of the present invention.

These drawings will be discussed in relation with FIGS. 5A to 5D which illustrate, in the form of timing diagrams, some shapes of signals characteristic of the present invention.

Be it in the master modem or in the slave modem, a digital signal Tx to be transmitted (FIG. 3A or 4A) is applied to the input of a circuit 21*u*, respectively 21*v*, applying an inverse Fourier transform (IFFT). What here distinguishes the master circuit from the slave circuits is that, in master circuit 21*u*, the transform is performed on U inputs while in each slave circuit 21*v*, the transform is only performed on V inputs, with U=n*V, where n represents the maximum number of slave modems likely to be managed by the master node.

The U or V outputs of circuits 21*u*, respectively 21*v*, are serialized in a converter (P/S), respectively 22*u* or 22*v*.

The output of converter 22*u* or 22*v* is connected to the input of a processing circuit 23 (CP/CS) for shaping the time signal according to the present invention. Circuit 23 introduces the cyclic prefixes and suffixes in the intervals separating two OFDM symbols in the time field.

Figure 5A:
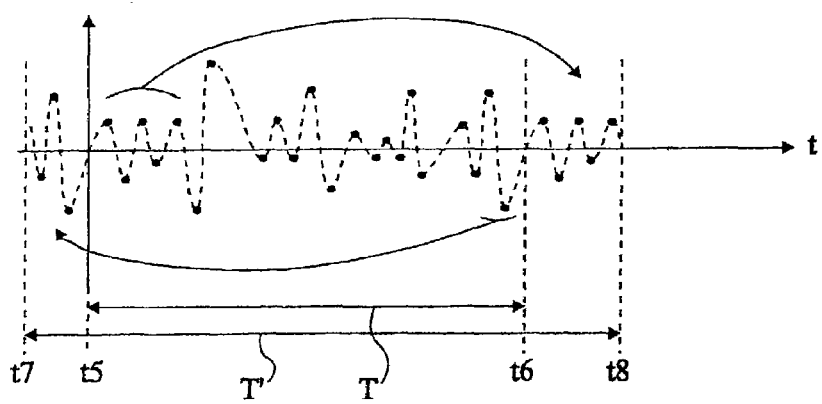
FIGS. 5A to 5D illustrate, in the form of timing diagrams, the operation of the present invention, on the slave node side.

FIG. 5A illustrates the processing performed by circuits 23, be it in slave modems or in the master modem. This drawing shows, in a more detailed manner, a data flow of the type of those illustrated in FIG. 2. The actual OFDM symbol is included between times t5 and t6. The end of the symbol is copied at the beginning, between a time t7 and time t5. The beginning of the symbol is copied at the end, between time t6 and a time t8. Whatever the transmitter modem, duration T (times t5 to t6) of the OFDM symbol and duration T' (times t7 to t8) including the prefixes and suffixes are always the same.

As illustrated in FIG. 5A, it should be noted that the processing is always digital. Therefore, the symbol has been shown in the form of a succession of points forming digital samples on a curve drawn in dotted lines illustrating the corresponding analog signal.

In the case of the master modem, the output of circuit 23 is directly connected to the input of analog front end 24 (AFE) of the modem, the perfectly conventional function of which is to convert digital samples into an analog signal that it sends to tap P.

In the case of a slave modem (FIG. 4A), an oversampling (SE) of the data flow coming from circuit 23 is provided according to the present invention. This oversampling is performed in a circuit 25.

Figure 5B:
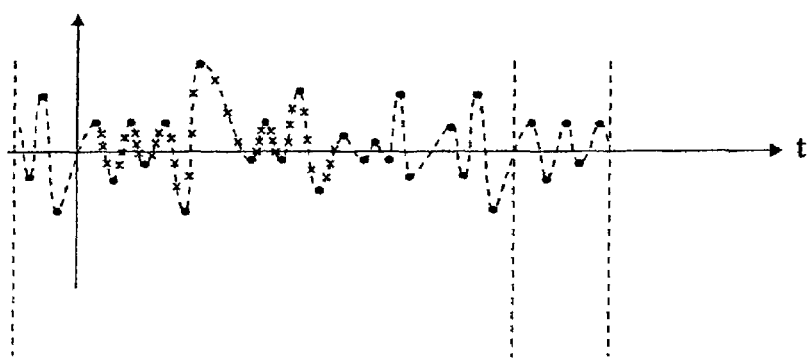

FIG. 5B illustrates, in the time field, an oversampling performed according to the present invention on the digital signal of FIG. 5A. This amounts to defining intermediary points (crosses) on the curve in dotted lines of FIG. 5A. For clarity, these intermediary points have only been partially shown in FIG. 5B.

In the frequency field, an oversampling copies the symbol in higher frequency bands with a periodicity depending on the oversampling ratio.

This oversampling ratio is, according to the present invention, specific to each slave modem. It is set by the master modem according to the frequency band assigned to the involved slave modem.

Figure 5C:
Figure 5D:
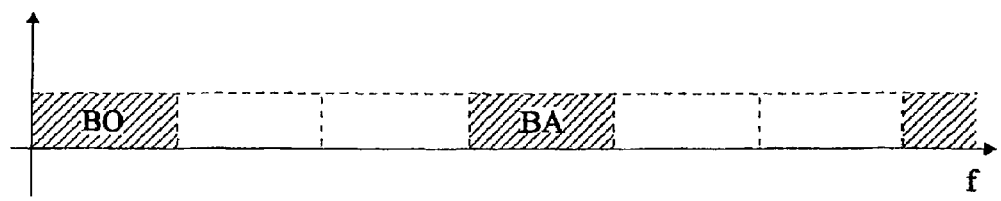

FIGS. 5C and 5D represent the frequency equivalents of FIGS. 5A and 5B, respectively. It is assumed that the oversampling ratio is 3 (introduces 3 additional points between two points resulting from the inverse Fourier transform). In FIG. 5C, the original frequency band BO is thus replicated with a periodicity of 3 times to give successive and separate frequency bands (hatchings in FIG. 5D).

At the output of oversampling circuit 25, the (digital) signal is applied to a band-pass filter 26*e* (BPF) programmable by a signal Pg and having the function of selecting the frequency band BA according to the band assigned to the involved slave modem. The filter eliminates not only the original band present at the oversampler output, but also the higher frequency distributions.

Thus, according to the present invention, the frequency band assignment to the slave modems is performed by the oversampling ratio and by programming of the band-pass filter.

It should be noted that all assigned frequency bands BA have the same width since they all come from an identical original frequency band.

In the example of FIG. 5D, it is assumed that filter 25 is programmed on the first replica. As an alternative, a replica of higher order may be selected.

The output of filter 26 is sent onto analog front end 24 of the modem. It can be seen that only the assigned frequency band BA is transmitted, the other replicas of original band BO having been filtered.

The reception is performed similarly.

For the master modem (FIG. 3B), the output of analog front end 24 (AFE) is directly connected to a circuit 27 (RCP/RCF) having the function of eliminating the cyclic prefixes and suffixes.

The output of circuit 27 is sent onto a series-to-parallel converter 28*u* (S/P), the U outputs of which are sent onto a circuit 29*u* performing a fast Fourier transform (FFT) on U points and providing received signal Rx.

For the slave modems (FIG. 4B), a programmable band-pass filter 26*r* (BPF) (signal Pg) associated with an undersampler 30 (DE) is interposed between analog front end 24 and circuit 27 for eliminating the prefixes and suffixes.

Further, converter 28v provides v bits to direct Fourier transform circuit 29v over V points.

Filter 26r is programmed to only let through the band assigned in receive mode for the involved slave modem. Thus, all bands transmitted by the master modem and intended for the other modems are eliminated. Afterwards, an undersampler 30 brings the received band into a so-called baseband corresponding, for the receive mode, to the original transmit band. An interlacing of the transmit and receive frequencies may be provided for each slave modem, while maintaining the transmit and receive frequencies of the different modems grouped (non-interlaced).

An advantage of the present invention is that all slave modems can have identical Fourier transform circuits, which improves the standardization of these slave modems.

Another advantage of the present invention is that the circuits of the slave modems are of simplified structure since they do not require processing all frequencies.

Only the master modem must be able to directly generate a symbol in the entire frequency range of the assigned bands and to accept this entire range. Due to the filterings performed by the different slave modems in transmit modes, the master modem is able to individualize the data flows coming from the different modems, even if these flows are simultaneous and overlap in time.

The adapting of a slave modem according to the present invention includes assigning it one transmit frequency band and one receive frequency band, then programming its oversampling and undersampling ratios as well as its transmit and receive band-pass filters. Such an adaptation is carried out by following instructions from the master modem which keeps, in its memory, a frequency assignment table.

A significant difference of the point-to-multipoint application with respect to the point-to-point application of telephony is that, in telephony, it is avoided to assign different frequencies to the different modems to avoid any crosstalk. Conversely, according to the present invention, it is indispensable to assign to each modem at least one transmit frequency and at least one receive frequency distinct from those of the other modems. Although the present invention can apply with a single carrier, it is mostly advantageous in the case of a multiple-carrier modulation. Indeed, the more the symbols are long in time, the less additional space a suffix covering the propagation times takes.

The possible synchronization of the network nodes may be performed as follows. For example, a signaling channel which conveys a time reference signal of the network may be used. All modems are assumed to be plugged on mains connection taps. Upon turning-on of the master modem, said modem permanently sends a specific OFDM signal formed of predefined data intended for all slave modems. Upon reception by the slave modem, the latter immediately sends back a response signal on another predefined signaling frequency. When the master modem receives the response, it can calculate the duration which then becomes the propagation duration that it sends back in a specific channel. Upon reception of the content of this channel, the slave modem now knows the duration to be applied for a transmission to its own OFDM signals, so that the two above-mentioned modems are now able to transmit signals at the same time.

Of course, the present invention is likely to have various alterations, modifications, and improvements which will readily occur to those skilled in the art. In particular, the implementation of the transmission method of the present invention is within the abilities of those skilled in the art based on the functional indications given hereabove. Further, although the present invention has been described in more specific relation with a network using the power cables as a transmission support, it may also apply to any other point-to-multipoint and/or multipoint-to-multipoint network in which similar problems are posed. As an example, applications to wireless communications in which the problems of the variation of the transfer function along time are posed, and which are multiple-path and multiple-reflection communications, will be mentioned. Further, if the assignment of one transmit frequency band and of one receive frequency band forms a preferred embodiment, it may be provided to assign several transmit and receive bands to each slave modem. The filters should in this case each have several pass-bands and several over- and undersampling ratios must be provided.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for communicating data between a master modem and at least one slave modem of a master-slave network in orthogonal frequency-division multiplexing, including:
    assigning to each slave modem at least one transmit frequency band and at least one receive frequency band chosen in a range of frequencies of the master modem; and
    in each slave modem:
    oversampling a transmitted symbol containing the data; and
    filtering, downstream of the oversampling, using a band-pass filter having a pass band corresponding to the slave modem's assigned transmit frequency band, wherein the oversampling ratios are different for each slave modem and are chosen according to the assigned frequency bands.

2. The method of claim 1, further including adding a cyclic prefix and a cyclic suffix reproducing a predetermined number of samples, respectively of the end and of the beginning of the symbol, to each transmitted symbol.

3. The method of claim 1, wherein the transmission support of the network is formed by the electric supply system.

4. The method of claim 1, wherein the times at which symbol transmission begins at each of the modems are synchronized.

5. The method of claim 4, wherein a communication channel is used to synchronize the transmissions from each of the modems.

6. The method of claim 1, wherein the symbols (OFDM) to be transmitted are shaped to avoid intercarrier interference.

7. A method for communicating data between a master modem and at least one slave modem of a master-slave network in orthogonal frequency-division multiplexing, including:
    assigning to each slave modem at least one transmit frequency band and at least one receive frequency band chosen in a range of frequencies of the master modem; and in each slave modem:
  filtering a received symbol containing the data using a band-pass filter having a pass band corresponding to the slave modem's assigned receive frequency band; and
  undersampling the filtered symbol, wherein the undersampling ratios are different for each slave modem and are chosen according to the assigned frequency bands.

8. For use in an orthogonal frequency-division multiplexed (OFDM) network, a slave modem to produce an output in a selected frequency band, comprising:
  a Fourier transform circuit to convert digital data to OFDM symbols;
  an oversampler connected to an output of the Fourier transform circuit to produce a symbol in the selected frequency band;
  a band-pass filter connected to an output of the oversampler having a pass band including the selected frequency band to selectively pass the symbol n the selected frequency band;
  a parallel-to-series converter connected between the Fourier transform circuit and the oversampler; and
  a processing circuit connected between the parallel-to-series converter and the oversampler, to apply a cyclic prefix and a cyclic suffix to at least one of the OFDM symbols.

9. The slave modem of claim 8, wherein the Fourier transform circuit performs an inverse Fourier transform on the digital data.

10. The slave modem of claim 8, further comprising an analog front end connected to the output of the band-pass filter.

11. The slave modem of claim 8, wherein the band-pass filter is programmable to select the frequencies of the pass band.

12. The slave modem in claim 11, wherein the slave modem is adapted to be connected to a mains connection tap.

13. For use in an orthogonal frequency-division multiplexed (OFDM) network, a slave modem to receive an OFDM symbol in a selected frequency band, comprising:
  a band-pass filter to selectively pass symbols in a pass band which includes the selected frequency band;
  an undersampler connected to an output of the pass band filter to convert the symbol to the base band;
  a Fourier transform circuit connected to the output of the undersampler, the Fourier transform circuit converting the OFDM symbol to digital data;
  a series-to-parallel converter connected between the undersampler and the Fourier transform circuit; and
  a processing circuit connected between the series-to-parallel converter and the undersampler, to eliminate a cyclic prefix and a cyclic suffix from at least one of the OFDM symbols.

14. The slave modem of claim 13, wherein the Fourier transform circuit performs perform a direct Fourier transform.

15. The slave modem of claim 13, further comprising an analog front end connected to the input of the band-pass filter.

16. The slave modem of claim 13, wherein the band-pass filter is programmable to select the frequencies of the pass band.

17. The slave modem in claim 13, wherein the slave modem is connected to a mains connection tap.

* * * * *